UNITED STATES PATENT OFFICE.

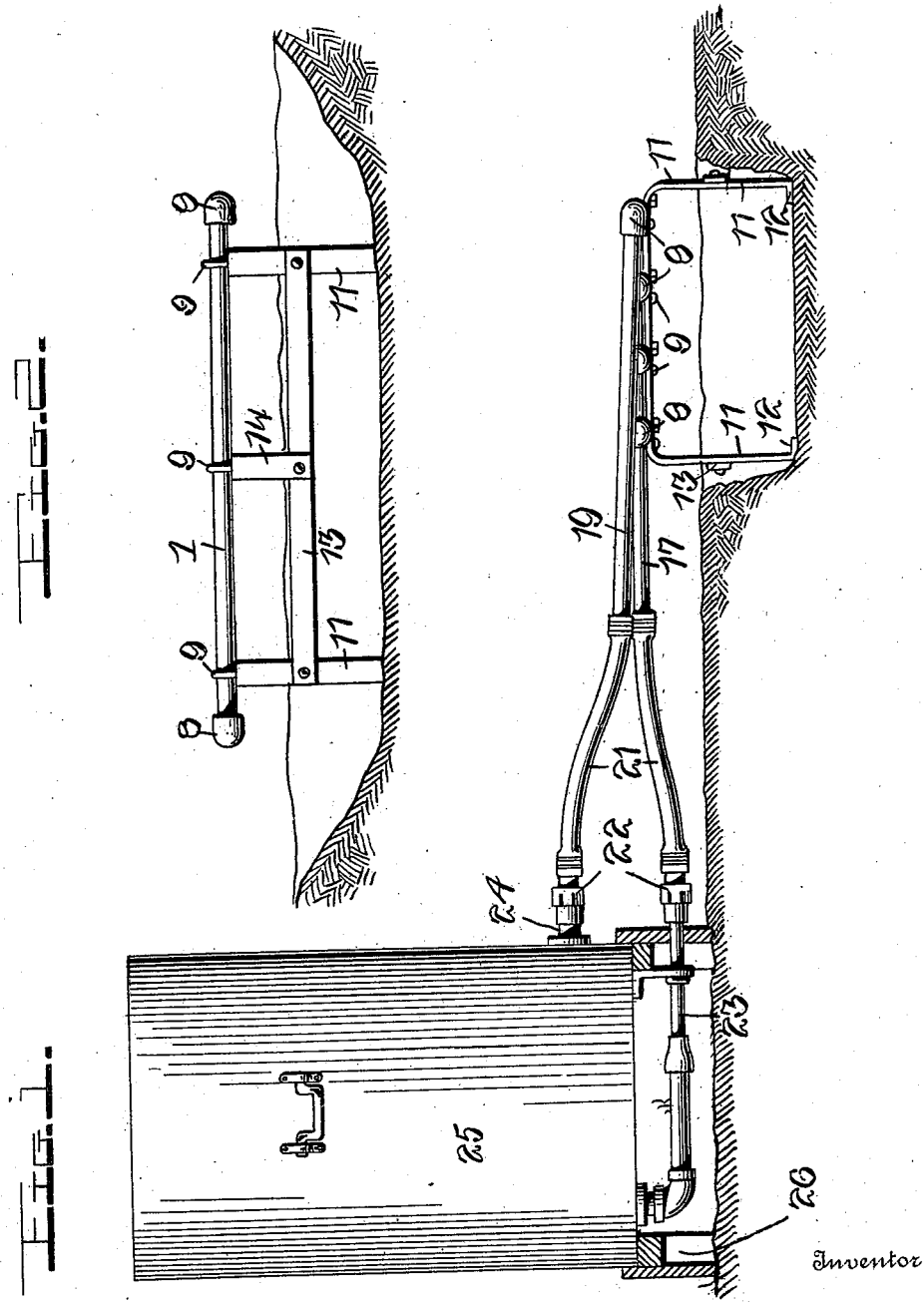

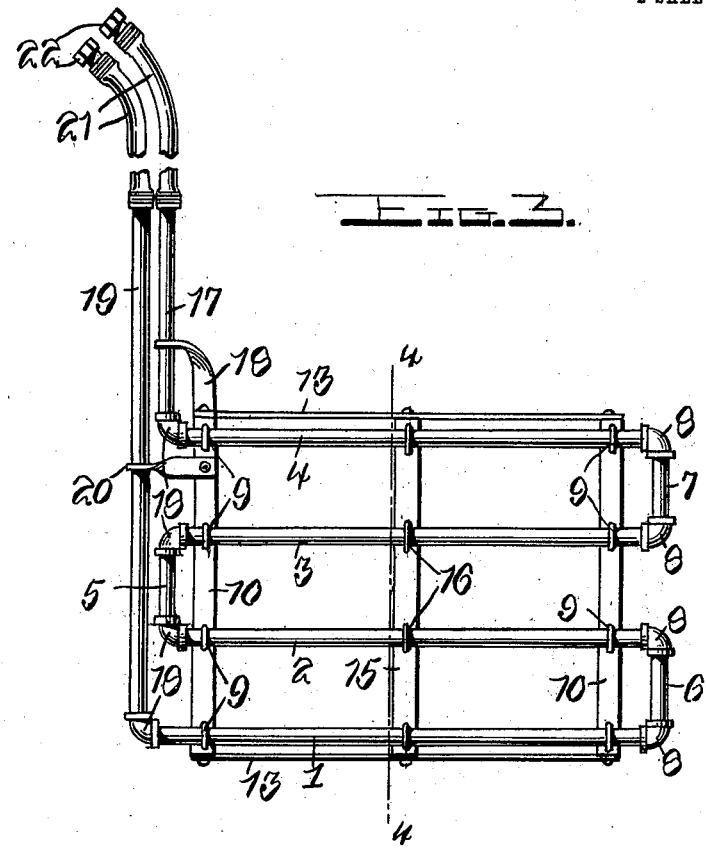

GUSTAV BEYER, OF FORT SILL, OKLAHOMA.

COMBINED FIELD WATER-HEATER AND GRATE.

981,609. Specification of Letters Patent. Patented Jan. 17, 1911.

Application filed May 4, 1910. Serial No. 559,342.

*To all whom it may concern:*

Be it known that I, GUSTAV BEYER, a citizen of the United States, residing at Fort Sill, Comanche county, and State of Oklahoma, have invented certain new and useful Improvements in Combined Field Water-Heaters and Grates, of which the following is a specification, reference being had to the accompanying drawings.

This invention is a combined field water heater and grate and it is especially adapted for army field service and for analogous purposes.

The object of the invention is to provide a simple and practical device of this character which will be primarily a field water heater for affording an abundant supply of hot water, but which may also be used as a cooking grate or grill without in any way interfering with the use of the device as a water heater, the use of the device as a cooking grate or grill enabling the frying of steaks, the boiling of coffee or potatoes and analogous operations to be performed in a highly effective manner.

With the above and other objects in view, the invention consists of the novel construction, combination and arrangement of parts, hereinafter fully described and claimed, and illustrated in the accompanying drawings in which:—

Figure 1 is a side view of the device, the support for the water tank being in section; Fig. 2 is an end elevation of the combined water heater and grate; Fig. 3 is a top plan view of the same; and Fig. 4 is a cross sectional view taken on the plane indicated by the line 4—4 in Fig. 3.

My improved combination field water heater and grate comprises a coil of pipe or pipes which form certain of the bars of a cooking grate or grill, and the ends of which are adapted to be connected to a water supply tank. In the preferred embodiment of the invention which I have illustrated the water coil consists of four spaced parallel pipe sections 1, 2, 3, 4, forming the longitudinal bars of the grate. The inner sections 2, 3, are united by a short transverse or end section 5 and the opposite ends of these inner sections are united to the two outer sections or pipes 1, 4, by short transverse sections 6, 7, the several sections being connected by elbows 8, as clearly shown in Fig. 3. The several longitudinal bars or pipes of the grate are united by U-shaped bolts or clips 9 to two inverted U-shaped end frames 10 which have depending ends 11 forming supporting legs, the latter terminating in inturned feet 12. The legs 11 of the two end frames are united by longitudinal side braces or bars 13, and the latter are in turn united to the depending ends 14 of a centrally arranged transversely extending brace bar 15 which is of inverted U-shape and has its central portion united by clip bolts 16 to the inner pipes or sections 2, 3, of the grate.

17 denotes a horizontally arranged feed pipe connected by an elbow to one end of the pipe section 4 and projecting from one side of one end of the grate and supported in the eye of an angular bracket 18 secured to one of the legs 11.

19 denotes an inclined return pipe arranged substantially parallel with the feed pipe 17, and having its ends connected by an elbow to one end of the pipe section 1. This return pipe 19 is supported in the eye of a bracket 20 which is secured to and projects from the top of one of the end frames 10. The two pipes 17, 19, have connected to them rubber steam hose 21 or similar flexible pipes carrying couplings or unions 22 for detachable engagement with pipes 23, 24, of a water tank 25. The latter is preferably a galvanized metal tank having an open top to receive a removable cover and provided on its sides with suitable handles. The bottom of the tank is removably arranged on a base 26, here shown in the form of a wooden box. The pipe 23 extends through the base or box 26 and is composed of three pipe sections of different diameters connected by reducing connections or couplings and having its largest section disposed vertically and in communication with the bottom of the tank 25. The pipe or nipple 24 extends through the side wall of the tank at a suitable distance from its bottom and is of the same diameter as the largest section of the pipe 23. Owing to the difference in elevation between these pipes 23, 24, and also to the difference in size between said pipes, there will be a difference in pressure and hence a flow or circulation through them and through the coil forming the supporting bars of the grate or grill.

In operation, the supporting framework for the water coil which forms a part of the grate is preferably set in a pit or excavation made in the ground so that said coil will be disposed close to the surface and the tank will be supported by the box or base 26, slightly above the surface. After the grate has been positioned the couplings or unions 22 are applied to the connections on the pipes 23, 24, and the fire is built under the grate. The heat from the fire will quickly boil the water in the pipes forming the coil and a circulation of water will be started so that the intermediate body of water in the tank will soon be heated. While this operation is going on food to be cooked may be placed on the grate or grill or in suitable vessels placed on the latter, and such cooking operation will not in any way interfere with the heating of the water in the tank.

Having thus described the invention, what is claimed is:

1. A device of the character described comprising a water heating coil consisting of spaced parallel longitudinal pipes united by short connecting pipes and feed and return pipes connected to the ends of the two outermost longitudinal pipes, a supporting structure for the coil consisting of inverted U-shaped end frames having their central portions united to the longitudinal pipes, and their end portions depending to form supporting legs, an inverted U-shaped brace having its central portion united to the longitudinal pipes and its end portions depending, longitudinal side bars united to the depending ends of the brace and to the legs of the two end frames, brackets connected to one of the end frames for supporting the feed and return pipes, and flexible pipes connected to the feed and return pipes and carrying coupling devices.

2. A device of the character described comprising a water heating coil consisting of spaced parallel longitudinal pipes united by short connecting pipes and feed and return pipes connected to the ends of the two outermost longitudinal pipes, a supporting structure for the coil consisting of inverted U-shaped end frames having their central portions united to the longitudinal pipes, and their end portions depending to form supporting legs, an inverted U-shaped brace having its central portion united to the longitudinal pipes and its end portions depending, longitudinal side bars united to the depending ends of the brace and to the legs of the two end frames, brackets connected to one of the end frames for supporting the feed and return pipes, a water tank, a base for supporting the same, feed and return pipes for the tank, the feed pipe for the tank extending through its base, flexible pipes connected to the first mentioned feed and return pipes, detachable coupling devices between the flexible pipes and the feed and return pipes on the tank.

In testimony whereof I hereunto affix my signature in the presence of two witnesses.

GUSTAV BEYER.

Witnesses:
 JOSEPH G. BYE,
 JOSEPH M. WISE.